United States Patent
Edpalm (10) Patent No.: US 11,303,903 B2
(45) Date of Patent: Apr. 12, 2022

(54) METHOD AND SYSTEM FOR ENCODING AN IMAGE OF A VIDEO SEQUENCE INVOLVING CALCULATION OF A COST FOR ENCODING A COHERENT REGION

(71) Applicant: Axis AB, Lund (SE)

(72) Inventor: Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/082,156

(22) Filed: Oct. 28, 2020

(65) Prior Publication Data

US 2021/0168373 A1 Jun. 3, 2021

(30) Foreign Application Priority Data

Dec. 3, 2019 (EP) .................................... 19213109

(51) Int. Cl.
| | |
|---|---|
| *H04N 19/139* | (2014.01) |
| *H04N 19/167* | (2014.01) |
| *H04N 19/176* | (2014.01) |
| *H04N 19/182* | (2014.01) |
| *H04N 19/517* | (2014.01) |

(52) U.S. Cl.
CPC ......... *H04N 19/139* (2014.11); *H04N 19/167* (2014.11); *H04N 19/176* (2014.11); *H04N 19/182* (2014.11); *H04N 19/517* (2014.11)

(58) Field of Classification Search
CPC .. H04N 19/139; H04N 19/167; H04N 19/176; H04N 19/182; H04N 19/517; H04N 19/52; H04N 19/527; H04N 19/567
See application file for complete search history.

(56) References Cited

U.S. PATENT DOCUMENTS

| | | | |
|---|---|---|---|
| 8,107,748 B2 | 1/2012 | Miao et al. | |
| 2007/0047652 A1* | 3/2007 | Maruyama | H04N 19/521 |
| | | | 375/240.16 |
| 2013/0343458 A1* | 12/2013 | Miyoshi | H04N 19/52 |
| | | | 375/240.16 |
| 2015/0256850 A1* | 9/2015 | Kottke | H04N 19/139 |
| | | | 375/240.16 |
| 2015/0382012 A1 | 12/2015 | Hussain et al. | |
| 2017/0272771 A1* | 9/2017 | Edpalm | H04N 19/176 |
| 2018/0255315 A1 | 9/2018 | Edpalm | |
| 2018/0310022 A1 | 10/2018 | Edpalm et al. | |
| 2018/0332299 A1* | 11/2018 | Kimura | H04N 19/52 |

FOREIGN PATENT DOCUMENTS

| | | | | |
|---|---|---|---|---|
| EP | 2403247 A1 * | 1/2012 | ....... | H04N 21/47205 |
| WO | WO-2017131908 A1 * | 8/2017 | ........... | H04N 19/172 |

* cited by examiner

*Primary Examiner* — Francis Geroleo
(74) *Attorney, Agent, or Firm* — Volpe Koenig (57) ABSTRACT

A method encodes an image of a video sequence by analyzing motion in the video sequence to identify a coherent region in the image that has moved with a distance vector which is longer than a threshold since a previously encoded image in the video sequence. A cost for inter-coding the block is calculated as a combination of a cost for encoding a motion vector and a residual. For at least one block of pixels in the coherent region, the cost for encoding the motion vector is calculated relative to the distance vector of the coherent region instead of being calculated relative to a motion vector of a neighbouring block of pixels in the image. The block is then inter-coded if the combined cost for encoding the motion vector and the cost for encoding the residual when combined are below a cost for intra-coding the block of pixels.

15 Claims, 6 Drawing Sheets

METHOD AND SYSTEM FOR ENCODING AN IMAGE OF A VIDEO SEQUENCE INVOLVING CALCULATION OF A COST FOR ENCODING A COHERENT REGION

TECHNICAL FIELD

The present invention relates to the field of video coding. In particular, it relates to a method and a system for encoding an image of a video sequence.

BACKGROUND

When encoding a sequence of video frames, it is common practice to divide each video frame into blocks of pixels and encode the frame block-by-block. These blocks are known as macroblocks in H.264/MPEG-4 AVC, and coding units in H.265/HEVC. The blocks may be encoded as intra-blocks, sometimes referred to as I-blocks, or as inter-blocks, sometimes referred to as P- or B-blocks.

If a block is intra-coded, the pixel values are encoded with reference to pixel values of the current frame only, such as by extrapolating from the edges of neighbouring blocks in the same frame. This is in contrast to inter-coded blocks, which are encoded with reference to a matching block of pixels in a reference frame. Specifically, inter-coding of a block of pixels involves encoding a motion vector pointing to the matching block of pixels in the reference frame and encoding a residual between the block of pixels and the matching block of pixels. To make the encoding of the motion vector of a block of pixels more efficient, it is usually encoded relative to motion vectors of nearby blocks of pixels, such as relative to a motion vector of a previously encoded neighbouring block in the same frame.

In some frames, referred to as intra-frames, all blocks of pixels are intra-coded. In other frames, referred to as inter-frames, some blocks of pixels are intra-coded and others are inter-coded. In inter-frames, a decision is made on a block-by-block basis whether to encode the block of pixels as an intra-coded block or an inter-coded block. The decision is usually made based on which of intra-coding and inter-coding will give the lowest encoding cost. The cost for intra-coding a block may be given in terms of a predefined value, while the cost for inter-coding a block is determined as a combined cost for encoding the motion vector and the residual.

The approach of deciding on a block-by-block basis whether to intra-code or inter-code a block of pixels has some drawbacks. Specifically, decisions which may seem to be optimal on a block level, may in some situations be sub-optimal on a frame level and may in the end lead to an unnecessarily high cost for encoding the frame.

An example of such a situation is where an object spanning multiple blocks of pixels has moved a considerable distance since a previously encoded frame. For blocks of pixels within the object, a motion search likely comes up with a candidate motion vector which is of considerable length and corresponds to the motion of the object since the previously encoded frame. Since a long motion vector is costly to encode, it may not appear to be a good decision to use the long motion vector for any single block of pixels. Particularly this will be the case for higher compression levels since the residual theoretically becomes smaller for high compression levels, but the cost for encoding the motion vector remains the same regardless of the compression level. Instead, the existing block-by-block methodology will decide to encode the blocks within the object as intra-coded blocks or as inter-coded blocks with shorter motion vectors. However, a better decision on a frame level had likely been to take the extra cost for encoding the long motion vector having in mind that motion vectors are encoded relative to each other. There is thus room for improvements.

SUMMARY

In view of the above, reducing the total bit cost for encoding an image depicting an object that has moved a considerable distance since a previously encoded image in a video sequence would be beneficial.

According to a first aspect, a method for encoding an image of a video sequence comprises:

analysing motion in the video sequence to identify a coherent region in the image that has moved with a distance vector which is longer than a threshold since a previously encoded image in the video sequence, encoding blocks of pixels in the image by, for each block of pixels:

performing block matching to find a motion vector pointing to a matching block of pixels in a reference image and to calculate a residual between the block of pixels and the matching block of pixels, calculating a cost for encoding the motion vector and a cost for encoding the residual, wherein, for at least one block of pixels in the coherent region, the cost for encoding the motion vector is calculated as a cost for encoding the motion vector relative to the distance vector of the coherent region instead of being calculated as a cost for encoding the motion vector relative to a motion vector of a neighbouring block of pixels in the image, and encoding the block of pixels as an inter-coded block if the cost for encoding the motion vector and the cost for encoding the residual when combined are below a cost for intra-coding the block of pixels.

With this approach, the decision whether to intra- or inter-code a block of pixels is taken on a block level. Still, by changing the manner in which the cost for encoding the motion vector is calculated for at least one block of pixels in the coherent region, the encoder can be "fooled" to take on the extra cost for encoding a long motion vector for one or more blocks in the coherent region. In that way, the total actual bit cost for encoding the coherent region may be reduced.

In more detail, the cost for encoding a motion vector is normally evaluated in relation to a motion vector of a neighbouring block of pixels in the image. This way of calculating the cost corresponds to the actual bit cost of encoding the motion vector. Thus, the encoder normally considers it cheap to encode a motion vector which is similar to a motion vector of a neighbouring block of pixels in the image.

However, for at least one block of pixels in the coherent region, the cost for encoding a motion vector is instead evaluated in relation to a distance vector of the coherent region. In this way, for the at least one block of pixels in the coherent region, the encoder is made believe that it is cheap to encode a motion vector being similar to the distance vector of the coherent region. As a result, the encoder will be more likely to make a decision to inter-code the at least one block of pixels with a motion vector being equal to or close to the distance vector of the coherent region. In reality, however, the actual bit cost for encoding the motion vector of the at least one block of pixels will still be the cost for encoding the motion vector relative to a motion vector of a neighbouring block of pixels. In this way, the encoder is hence "fooled" to take on the extra cost for encoding a long and costly motion vector for at least one block of pixels in the coherent region. Motion vectors of the other blocks of pixels in the coherent region may then be encoded at a low cost relative to the long and costly motion vector of the at least one block of pixels. Thus, in the end, the total actual bit cost for encoding the coherent region may be reduced.

By a coherent region in the image is meant a region of contiguous pixels in the image. The identified coherent region corresponds to an area in the image that has moved by approximately the same amount and in the same direction. The coherent region may for example correspond to a moving object depicted in the video. The coherent region may also correspond to the entire image, for instance when the image is captured by a panning and/or tilting camera.

By a previously encoded image in the video sequence is meant an image in the video sequence that is before the current image in encoding order. This could be a previous image in the video sequence in case of P-type coding, or a future image in the video sequence in case of B-type coding.

By a distance vector of the coherent region is generally meant a vector which is indicative of the amount and direction of movement of the coherent region in the image since a previously encoded image in the video sequence. The distance vector may correspond to an average amount and direction of movement the pixels in the coherent region. The distance vector points from a position of the coherent region in the image to a position of the coherent region in the previously encoded image.

By a reference image is generally meant an image in relation to which the current image of the video sequence is encoded. The reference image may correspond to the previously encoded image in the video sequence. Specifically, it may be calculated from the previously encoded image in the video sequence. For example, the reference image may be calculated by first encoding the previously encoded image and then decoding it again, as is common practice in video coding.

By encoding a motion vector relative to another vector is generally meant that a difference between the motion vector and the other vector is encoded. The cost for encoding a motion vector relative to another vector may hence be calculated as a cost for encoding the difference between the motion vector and the other vector.

The at least one block of pixels in the coherent region, for which the cost for encoding the motion vector is calculated relative to the distance vector, may include a first block of pixels in the coherent region to be encoded. In more detail, blocks of pixels in the coherent region may be encoded in a predetermined order, wherein the at least one block of pixels in the coherent region may include a block of pixels in the coherent region which is encoded first according to the predetermined order. For instance, the blocks of pixels may be encoded in a raster scan order, and the block of pixels in the coherent region which appears first in the raster scan order is included in the at least one block of pixels. In this way, the extra cost for encoding the long motion vector corresponding to the distance vector of the coherent region is taken already for the first encoded block of pixels in the coherent region. Motion vectors of later encoded blocks of pixels in the coherent region may then be encoded at low cost relative to that long motion vector.

In some cases, said at least one block of pixels in the coherent region only includes the block of pixels in the coherent region which is encoded first according to the predetermined order. This is advantageous in that the extra cost for encoding a long motion vector is only taken once. This may be enough in cases where the motion vector of an inter-coded block is encoded relative to any one of its previously encoded neighbouring blocks of pixels in the image, as is the case in the H.265/HEVC standards.

In other cases, the motion vector of a neighbouring block of pixels in the image corresponds to a median of motion vectors of a (typically odd) number of previously encoded neighbouring blocks of pixels in the image. This is for example the case in the H.264/MPEG-4 AVC standard, where a motion vector of an inter-coded block is encoded relative to a median of the motion vectors of three previously encoded neighbouring blocks of pixels in the image. In these other cases, the at least one block of pixels in the coherent region preferably includes two or more blocks of pixels.

More generally, said at least one block of pixels in the coherent region may include all blocks of pixels in the coherent region having less than a predetermined number of previously encoded neighbouring blocks of pixels within the region. This requirement keeps the number of blocks for which there is an extra cost for encoding a long motion vector at a minimum, at the same time as it allows the motion vectors of all remaining blocks within the coherent region to be encoded at a low cost relative to a previously encoded long motion vector.

For the H.265/HEVC case referred to above, the extra cost is only taken for a block in the region if there is no previously encoded neighbouring block in the region. In that case the predetermined number is hence equal to one. For the H.264/MPEG-4 AVC case, where a median of motion vectors over three neighbouring blocks is calculated, the extra cost is taken for blocks having less than two previously encoded neighbouring blocks in the region. In that case, the predetermined number is hence equal to two.

Preferably, to optimize the encoding cost for the region, the at least one block of pixels in the coherent region only includes the blocks of pixels in the coherent region having less than a predetermined number of previously encoded neighbouring blocks of pixels within the region.

In some cases, the at least one block of pixels in the coherent region may include all block of pixels in the coherent region. This approach may be used regardless of which encoding standard is being employed.

The step of performing block matching may include using a motion vector search window to find the motion vector pointing to a matching block of pixels in the reference image. The search window may be centered around the motion vector of a neighbouring block of pixels. That is, the search window has its center at the block of pixels in reference image to which the motion vector of the neighbouring block points. Such a positioning of the search window is normally used for the blocks of pixels in the image. However, for the at least one block of pixels in the coherent region, the search window may instead be centered around the distance vector of the coherent region. In that way, the block matching will more likely end up with finding a motion vector corresponding to the distance vector for the at least one block of pixels in the coherent region.

The above positioning of the search window may also conveniently be used to implement the motion vector encoding cost calculation. Specifically, the cost for encoding the motion vector of a block of pixels may be calculated as a cost for encoding the motion vector relative to a vector around which the motion vector search window is centered. For the at least one block of pixels in the coherent region, the search window is centered around the distance vector of the coherent region, and hence the cost for encoding the motion vector will for those blocks be calculated relative to the distance vector of the coherent region. This is in contrast to other blocks of pixels in the image where the search window is centered around the motion vector of a neighbouring block of pixels in the image, and the cost for encoding the motion vector consequently is calculated relative to the motion vector of the neighbouring block of pixels.

The video sequence may be captured by a camera having a movable field-of-view, wherein the step of analysing motion in the video sequence is based on an input from the camera regarding a movement of the field-of-view. For example, the camera may be a camera with pan and tilt capabilities. Since a motion of the whole field-of-view introduces a global motion in the image, the coherent region in the image may in that case be identified as the whole image and the distance vector corresponds to the amount and direction of the global movement in the image since the previously encoded image. That global motion may be derived once the motion of the field-of-view is known.

The step of analysing motion in the video sequence may include detecting objects and their motion in the video sequence using an object detection algorithm. For example, object detection algorithms which are based on deep learning technology may be used for this purpose.

The size of the coherent region in the image may be larger than a threshold which depends on the length of the distance vector of the coherent region. In this way, the extra cost taken for encoding a long motion vector for at least one block of pixels in the coherent region may be balanced against what is earned by getting a low encoding cost for the remaining blocks of pixels in the coherent region. As the extra encoding cost increases with the length of the distance vector, larger coherent regions may be needed for longer distance vectors in order for the method to pay off. The region size threshold may hence increase as a function of the length of the distance vector.

The method further extends to the case when there are more than one coherent region in the image. Specifically, the method may further comprise:

analysing motion in the video sequence to identify a second coherent region in the image that has moved with a second distance vector which is longer than a threshold since a previously encoded image in the video sequence, wherein, for at least one block of pixels in the second coherent region, the cost for encoding the motion vector is calculated as a cost for encoding the motion vector relative to the second distance vector of the second coherent region instead of being calculated as a cost for encoding the motion vector relative to a motion vector of a neighbouring block of pixels in the image.

According to a second aspect, there is provided a system for encoding an image of a video sequence, comprising:

an analyser configured to analyse motion in the video sequence to identify a coherent region in the image that has moved with a distance vector which is longer than a threshold since a previously encoded image in the video sequence, and an encoder configured to encode blocks of pixels in the image by, for each block of pixels:

performing block matching to find a motion vector pointing to a matching block of pixels in a reference image and to calculate a residual between the block of pixels and the matching block of pixels, calculating a cost for encoding the motion vector and a cost for encoding the residual, wherein, for at least one block of pixels in the coherent region, the cost for encoding the motion vector is calculated as a cost for encoding the motion vector relative to the distance vector of the coherent region instead of being calculated as a cost for encoding the motion vector relative to a motion vector of a neighbouring block of pixels in the image, and encoding the block of pixels as an inter-coded block if the cost for encoding the motion vector and the cost for encoding the residual together are below a cost for intra-coding the block of pixels.

According to a third aspect, there is provided a non-transitory computer-readable medium having computer-code instructions stored thereon which, when executed by a processor, causes the processor to carry out the method of the first aspect.

The second and third aspects may generally have the same features and advantages as the first aspect. It is further noted that the embodiments relate to all possible combinations of features unless explicitly stated otherwise.

BRIEF DESCRIPTION OF THE DRAWINGS

The above, as well as additional objects, features and advantages will be better understood through the following illustrative and non-limiting detailed description of embodiments, with reference to the appended drawings, where the same reference numerals will be used for similar elements, wherein.

DETAILED DESCRIPTION OF EMBODIMENTS

The present embodiments will now be described more fully hereinafter with reference to the accompanying drawings, in which embodiments are shown.

Figure 1:
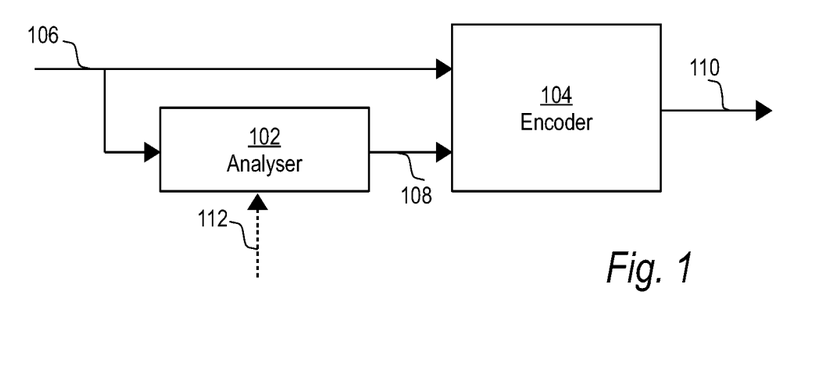
FIG. 1 schematically illustrates a system for encoding an image of a video sequence according to embodiments.

FIG. 1 illustrates a system 100 for encoding a video sequence 106. The system comprises an analyser 102 and an encoder 104. The system 100 may be implemented in a video camera capturing the video sequence 106. The video camera may be a video camera having a movable field-of-view, such as a pan-tilt-zoom camera.

The encoder 104 is arranged to receive the video sequence 106 and encode it to output an encoded video sequence 110. A general purpose of the encoder 104 is to encode the video sequence 106 as efficiently as possible, i.e., using as few bits as possible, without sacrificing the quality of the video.

To achieve this purpose, the encoder 104 further receives an input 108 from the analyser 102. The input 108 may, for each image in the video sequence 108, indicate one or more coherent regions in the image and a distance vector for each of the coherent regions. The distance vector tells how far and in what direction the coherent region has moved since a previously encoded image in the video sequence 106. A threshold distance may be set such that only coherent regions being associated with distance vectors being longer than the threshold distance are included in the input 108 being forwarded to the encoder 104. Further, a size threshold may be set such that a coherent region is only included in the input 108 if it is larger than the size threshold. The size threshold may depend on the length of the distance vector of the coherent region according to a predetermined relationship. Typically, the size threshold increases with increasing length of the distance vector.

By using the additional input 108, the encoder 104 may encode images in which there are such coherent regions more efficiently. This will now be explained in more detail with reference to the flow chart of FIG. 2 which exemplifies the operation of the system 100 when encoding an image in the video sequence 106.

Figure 2:
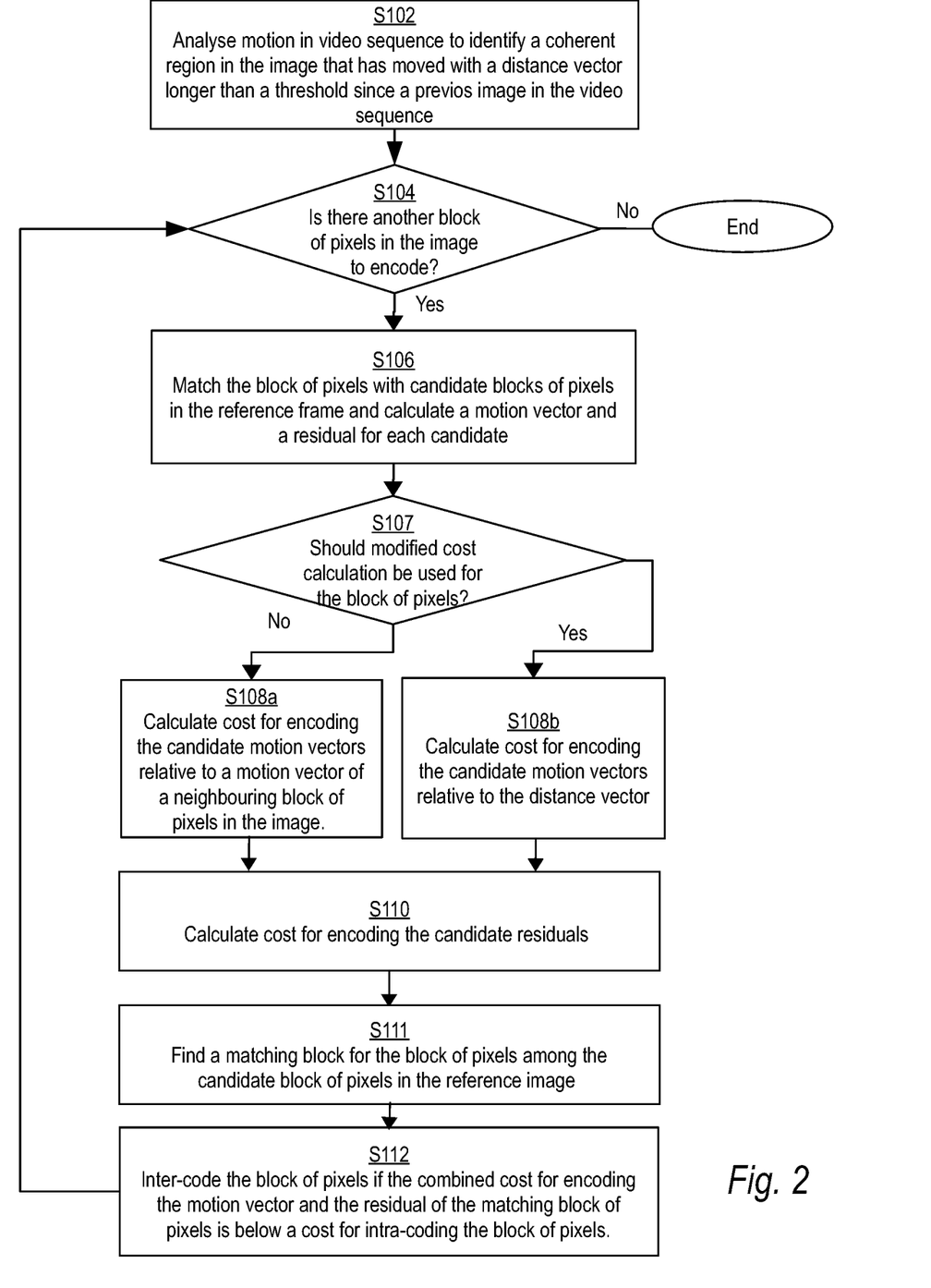
FIG. 2 is a flow chart of a method for encoding an image of a video sequence according to embodiments.
Figure 3:
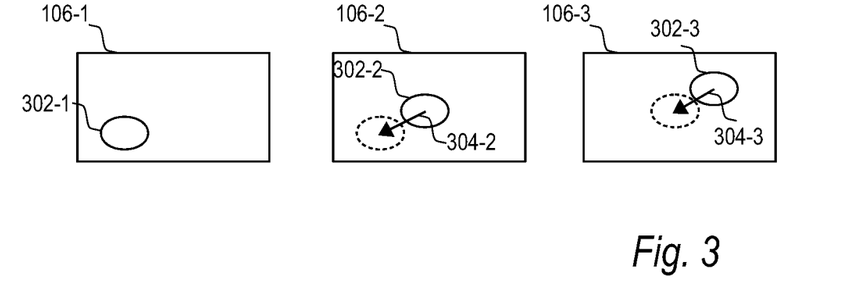
FIG. 3 and FIG. 4 each schematically illustrates a coherent region and an associated distance vector identified in images of the video sequence by the analyser of the system shown in FIG. 1.

In step S102, the analyser 102 analyses motion in the video sequence 106. Particularly, the analyser 102 may detect objects in the images of the video sequence 106 and analyse how the objects move between the frames. For this purpose, the analyser 102 may implement any known object detection algorithm or object tracking algorithm. For example, the analyser 102 may include a deep learning network which implements such an object detection and/or object tracking algorithm. To further exemplify this process, FIG. 3 shows three consecutive images 106-1, 106-2, 106-3 of the video sequence 106 in each of which the analyser 102 has detected an object 302. The detected object 302 is denoted by 302-1, 302-2, 302-3 in the three images 106-1, 106-2, 106-3, respectively. The object 302 may be seen as a coherent region in the image where the pixels have moved by approximately the same amount and in the same direction between two consecutive images. Once an object 302 has been detected, the analyser 102 may find its movement between the images 106-1, 106-2, 106-3. Specifically, the analyser 102 may find how far an in what direction the object 302 has moved since a previously encoded image. In this example, it is assumed that the previously encoded image corresponds a previous image in the video sequence. This will be the case for P-type coding. For B-type coding, the previously encoded image is instead a future frame in the video sequence. For example, the analyser 102 may calculate a difference between the position of the object 302-1 in the previously encoded image 106-1 and the position of the object 302-2 in the current image 106-2. That difference may be represented in terms of a distance vector 304-2. For purposes of this calculation, the center of the object 302-1 and 302-2 may be used as the position of the object. As shown, the distance vector 304-2 points back to the position of the coherent region in the previously encoded image 106-1. For illustration purposes, the position of the object 302-1 in the previously encoded image 106-1 is shown in the image 106-2 using dashed lines. In a similar way, a distance vector 304-3 may be calculated for the image 106-3 in the sequence.

In cases where the video sequence 106 is captured by a video camera having a movable field-of-view, the analyser 102 may additionally, or alternatively, analyse motion in the video sequence 106 based on the movement of the video camera. For this purpose, the analyser 102 may receive input 112 from the camera regarding a movement of the field-of-view of the camera. The input 112 may, for instance, concern pan and tilt movements of the camera. The movement of the field-of-view introduces a global motion in the images of the video sequence 106. The analyser 102 may calculate the global motion in the image from the camera motion as represented by the input 112, and represent it in terms of a distance vector. Accordingly, in this case the analyser 102 may identify the whole image as being a coherent region having approximately the same amount of motion in the same direction.

Figure 4:
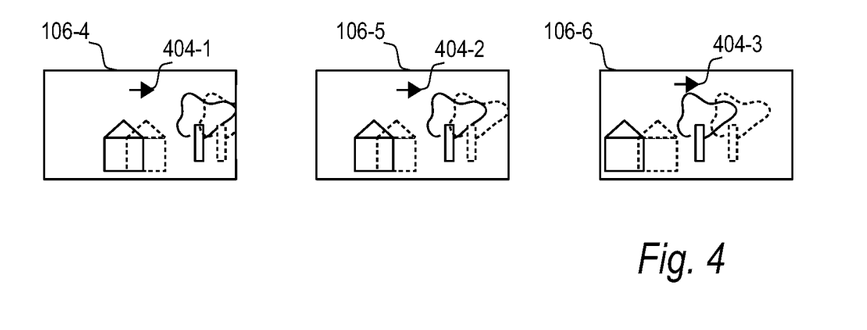

This is further illustrated in FIG. 4 showing three consecutive images 106-4, 106-5, 106-6 of the video sequence 106. In this example, it is assumed that the field of view of the camera is panning in the right direction. This introduces a global motion to the left in the images 106-4, 106-5, 106-6. For each of the images, the whole image may hence be seen as a coherent region that moves in the same way between two images. The analyser 102 may represent the global motion of the coherent region in terms of a distance vector 404-1, 404-2, 404-3. Similar to the FIG. 3 example, the distance vector 404-1, 404-2, 404-3 may be calculated as a difference between the position of the coherent region in the previously encoded image and its position in the current image. Hence the distance vector points back to the position of the coherent region in the previously encoded image.

When the analyser 102 has identified one or more coherent regions and their associated distance vector in an image, it may provide that information as input 108 to the encoder 104.

The encoder 104 may then proceed to encode the image. Generally, the encoder 104 may encode the image as an intra-coded image, sometimes known as I-frames, or as an inter-coded image, sometimes known as P- or B-frames. Whether to intra-code or inter-code the image may be specified by a group-of-pictures (GOP) structure, specifying the order of the intra- and inter-coded images in the video sequence 106. In this case it is assumed that the image is to be inter-coded.

The encoder 104 encodes the image block-wise. In particular, the image may be divided into blocks of pixels of a certain size, such as blocks of 8×8 pixels, 16×16 pixels, 32×32 pixels, which are encoded one after the other. Such blocks of pixels are also known in the art as macroblocks or coding units. The encoder 104 may encode these blocks of pixels in a predetermined order. The predetermined order typically corresponds to a raster scan-direction.

In step S104, the encoder 104 therefore checks whether there is another block of pixels in the image to encode. If so, the encoder 104 carries out steps S106, S107, S108a or S108b, S110, S112 with respect to the next block to be processed. Otherwise the method terminates and the system 100 will go on to analyse and encode the next image in the video sequence 106.

When inter-coding an image, some blocks may be intra-coded while others are inter-coded. Specifically, as will be described in more detail, the encoder 104 decides for each block whether it should be intra-coded or inter-coded. That decision is taken to minimize the cost for encoding the block, e.g., as expressed in the number of bits required to encode the block. In brief, the encoder 104 in steps S106, S107, S108a or S108b, and S110 calculates a cost for inter-coding the block of pixels, and in step S112 it makes a decision regarding whether to inter-code or intra-code the block of pixels.

In step S106 the encoder 104 starts a block-matching procedure which aims at finding a "best" matching block of pixels in the reference frame. The reference frame typically corresponds to an encoded and subsequently decoded version of the previously encoded image in the video sequence 106. Specifically, the encoder 104 may match the block of pixels in the currently processed image to a plurality of candidate blocks of pixels in the reference image in order to find a block of pixels in the reference image that gives the best match. The candidate blocks of pixels in the reference frames may be included in a search window in the reference frame. For each candidate block of pixels in the reference frame, the encoder 104 may calculate a motion vector and a residual i.e., the pixelwise difference between the blocks.

To evaluate what constitutes a good match between two blocks, the encoder 104 typically uses a cost function. The candidate block of pixels in the reference image that minimizes the cost function is selected as the best match. The encoder 104 may use a cost function which is a combination of the cost for encoding the motion vector and the cost for encoding the residual of the candidate block of pixels. According to the inventive concept, two different approaches of calculating the cost for encoding the motion vector, referred to herein as a modified and a regular cost calculation, are used for different blocks of pixels in the image.

In step S107 the encoder 104 checks whether a modified or a regular cost calculation should be used to calculate the cost for encoding the motion vector found in step S106. For most blocks of pixels in the image the regular cost calculation is applied. However, for at least one block of pixels within each coherent region, the modified cost calculation is used.

To perform this check, the encoder 104 may have a set of rules for when a block should follow the regular cost calculation or the modified cost calculation. These rules may vary for different groups of embodiments. The rules may also be related to how the regular cost calculation is performed.

In a first group of embodiments, the encoder 104 checks in step S107 whether the currently processed block is the first block within a coherent region to be encoded. This principle is exemplified in FIG. 5 which schematically illustrates an image 506 to be encoded. The image 506 includes a plurality of blocks of pixels 501. Further, there is a coherent region 502 in the image as illustrated by the shadowed area. Some of the blocks 501 are outside of the coherent region 502, while others are within the coherent region 502. Generally, a block of pixels may be said to be within the coherent region 502 if all pixels in the block are within the coherent region 502. Alternatively, a block of pixels may be said to be within the coherent region 502 if a majority of the pixels in the block are within the coherent region 502. The blocks of pixels 501 of the image 506 may be encoded in a predetermined order as indicated by the arrows 504. In this case the blocks 501 are encoded in a raster scan direction. When encoding the blocks in this order, the block of pixels 501a will be the first block within the coherent region 502 to be encoded. Hence, in this example, the encoder 104 will use the modified cost calculation for the block of pixels 501a, while it will use the regular cost calculation for all other blocks of pixels. In this example only one coherent region is shown. However, it is to be understood that if there were more than one coherent region within the image, the encoder 104 would apply the modified cost calculation to the first encoded block within each of the regions, and the regular cost calculation to all other blocks of pixels in the image.

In a second group of embodiments, the encoder 104 checks in step S107 whether the currently processed block is within a coherent region and is without any previously encoded neighbouring blocks of pixels within that coherent region. Generally, a block of pixels may have up to nine neighbour ring blocks of pixels in the image. Some of these blocks may be within a coherent region, and some may be outside of a coherent region. Further, some of the neighbouring blocks may already have been encoded while others remain to be encoded.

Referring back to FIG. 5, the block of pixels 501a has nine neighbouring blocks of pixels. Four of these (three above and one to the left) are encoded before the block 501a. However, none of these previously encoded blocks are within the coherent region. Thus, the block of pixels 501a is without any previously encoded neighbouring blocks of pixels within the region 502. The encoder 104 will thus apply the modified cost calculation to the block of pixels 501a. However, for the block 501b the situation is different. The block 501b also have four previously encoded neighbouring blocks of pixels (three above and one to the left). One of these, namely block 501a, is within the coherent region 502. Thus, the encoder 104 will not apply the modified cost calculation to the block 501b. If this exercise is carried out for each block in the image 506 it is found that also in this case the modified cost calculation is only applied to the block of pixels 501a.

Figure 6:
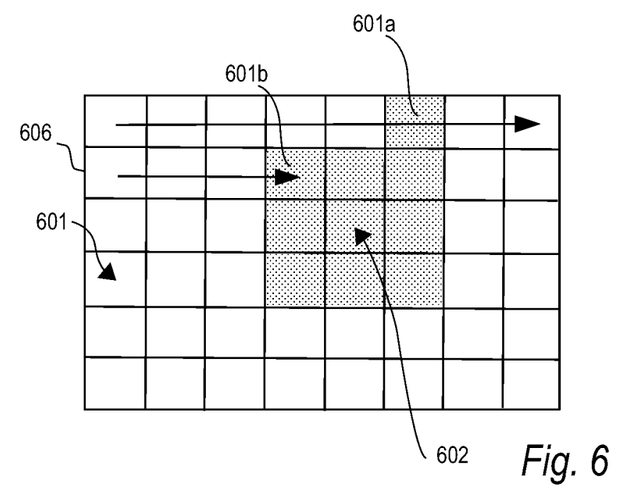
FIG. 6 schematically illustrates blocks of pixels within and outside of a coherent region of a second shape in an image.

However, depending on the shape of the coherent region, the first and the second groups of embodiments will not always give the same result. Such an example is illustrated in FIG. 6, showing an image 606 with a plurality of blocks of pixels 601 and a coherent region 602. In this case the first group of embodiments would apply the modified cost calculation to the block of pixels 601a only, since this is the first encoded block within the coherent region 602. However, the second group of embodiments would, in addition to the block 601a, also apply the modified cost calculation to the block of pixels 601b since it has no previously encoded neighbouring blocks within the coherent region 602. The second group of embodiments is hence more flexible when it comes to the shape of the coherent region.

In a third group of embodiments, the encoder 104 checks in step S107 whether the currently processed block is within the coherent region and has less than two previously encoded neighbouring blocks of pixels within the coherent region. For blocks satisfying this rule, the encoder 104 will apply modified cost calculation, while regular cost calculation will be applied to the remaining blocks. If this rule is applied to the example of FIG. 5 it is found that the blocks 501a, 501b, 501c all satisfy the rule since they have none or only one previously encoded neighbouring block within the region. In the example of FIG. 6, the blocks 601a and 601b satisfy the rule and will hence be subject to the modified cost calculations.

Figure 5:
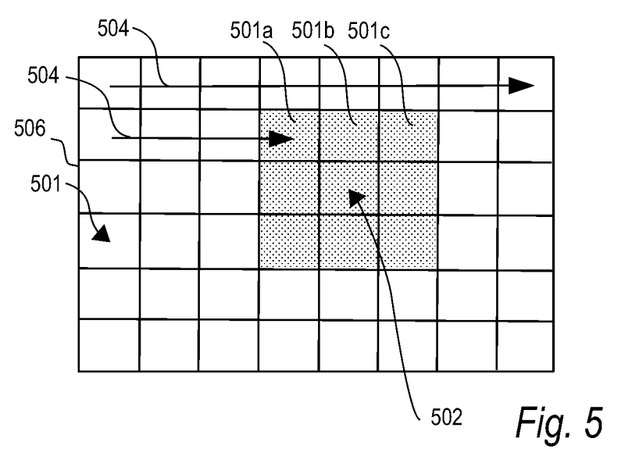
FIG. 5 schematically illustrates blocks of pixels within and outside of a coherent region of a first shape in an image.

In a fourth group of embodiments, the encoder 104 checks in step S107 whether the currently processed block is within the coherent region 502. For blocks satisfying this rule, the encoder 104 will apply the modified cost calculation. For blocks outside of a coherent region, the encoder 104 will apply the regular cost calculation. In the fourth group of embodiments, the encoder 104 will hence apply the modified cost calculation to all blocks within the coherent region 502.

As will be described below, these different groups of embodiments are advantageous in different situations. For example, the second group of embodiments are typically applied when the encoder 104 is configured to inter-code blocks of pixels using H.265/HEVC coding since H.265/HEVC coding typically code a motion vector of a block in relation to the motion vector of any one of its previously encoded neighbouring blocks. It is therefore enough that each block in the region has one previously encoded neighbouring block in the region to which the modified cost calculations have been applied. Similarly, the third group of embodiments are typically applied when the encoder 104 is configured to inter-code blocks of pixels using H.264/MPEG-4 AVC coding since H.264/MPEG-4 AVC coding typically code a motion vector in relation to a median of the motion vector of three of its previously encoded neighbouring blocks. It is therefore enough that each block in the region has two previously encoded neighbouring block in the region to which the modified cost calculations have been applied. The fourth group of embodiments is advantageous in that it may be applied regardless of the encoding standard being used by the encoder 104. This since the choice of the blocks to which the modified cost calculation is applied is not related to how the encoder 104 selects the motion vector of a previously encoded neighbouring block. The first group of embodiments may be seen as a simplification of the second group of embodiments when it comes to deciding which blocks should be processed using a modified cost calculation.

If the encoder 104 finds in step S107 that modified cost calculation does not apply to the currently processed block of pixels, it proceeds to step S108a and calculates the cost for encoding the motion vector of each candidate block of pixels in the reference image in a regular manner. In more detail, the cost for encoding a motion vector is calculated as a cost for encoding the motion vector relative to the motion vector of a neighbouring block of pixels in the image. Specifically, the neighbouring block of pixels may be a previously encoded neighbouring block of pixels.

Figure 7:
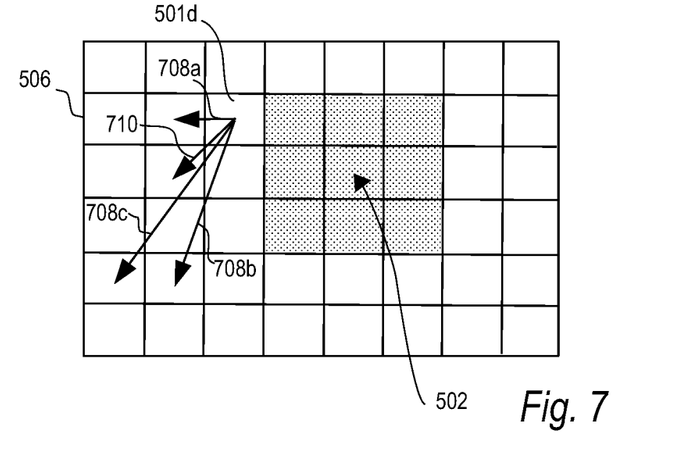
FIG. 7 schematically illustrates a regular cost calculation for a motion vector of a block of pixels in an image according to embodiments.

This procedure is further illustrated in FIG. 7 which is a continuation of the FIG. 5 example. In step S107, the encoder 104 decided (in each of the three groups of embodiments) that the regular cost calculation should be applied to a candidate motion vector 708a of the block of pixels 501d. To perform the cost calculation, the motion vector 708a is compared to the motion vector 710 of a previously encoded neighbouring block of pixels, and the cost for encoding the difference between these two vectors is calculated. For example, the cost for encoding the difference may be set to be equal (or proportional) to the length of the difference, which in this example is equal to the length of one block. Accordingly, the encoder 104 may come to the conclusion that the cost for encoding the candidate motion vector 708a of block 501d is equal to one. For candidate motion vectors 708b or 708c, the cost for encoding the motion vector had instead been equal to two and three, respectively (assuming that a Manhattan-type distance calculation is used). Thus, when the regular cost calculation is applied, the encoder 104 finds that it is cheap to encode motion vectors that are similar to that of a neighbouring block.

How to select the motion vector of the neighbouring block of pixels in the image differs in the different groups of embodiments.

In the second group of embodiments, the motion vector of any one of the previously encoded neighbouring blocks of pixels may be selected. In particular, the neighbouring motion vector that is most similar to the motion vector of the currently processed block of pixels may be selected. This approach is typically used when the encoder 104 is arranged to perform inter-coding following the H.265/HEVC standard.

In the third group of embodiments, the motion vector of the neighbouring block of pixels instead corresponds to a median of the motion vectors of a number of previously encoded neighbouring blocks of pixels. The median of the motion vectors is calculated by calculating a median for each element in the motion vectors. To simplify the calculation of the median, a median of the motion vectors of an odd number of previously encoded neighbouring blocks may be chosen. Typically, the odd number may be equal to three. For example, when blocks are encoded in a raster scan direction, a median of the motion vectors of the upper, upper right, and left neighbouring blocks may be used. This way of selecting the motion vector of the neighbouring block of pixels is typically used when the encoder 104 is arranged to perform inter-coding following the H.264/MPEG-4 AVC standards.

In the first group of embodiments, the motion vector of a previously encoded neighbouring block may be selected in the manner of any one of the second and third groups of embodiments. Preferably, however, it is selected as in the second group of embodiments.

The fourth group of embodiments is flexible with respect to how the motion vector of a previously encoded neighbouring block is selected. For example, the motion vector of a previously encoded neighbouring block of pixels may be selected as in the second group of embodiments (as in H.265/HEVC encoding) or as in the third group of embodiments (as in H.264), or as prescribed by the encoding standard being used.

If the encoder 104 instead finds in step S107 that modified cost calculation applies to the currently processed block of pixels, it proceeds to step S108b and calculates the cost for encoding each candidate motion vector found in step S106 in a modified manner. In more detail, instead of calculating the cost for encoding a motion vector of the block relative to a motion vector of a previously encoded neighbouring block, the cost is evaluated relative to the distance vector of the coherent region.

Figure 8:
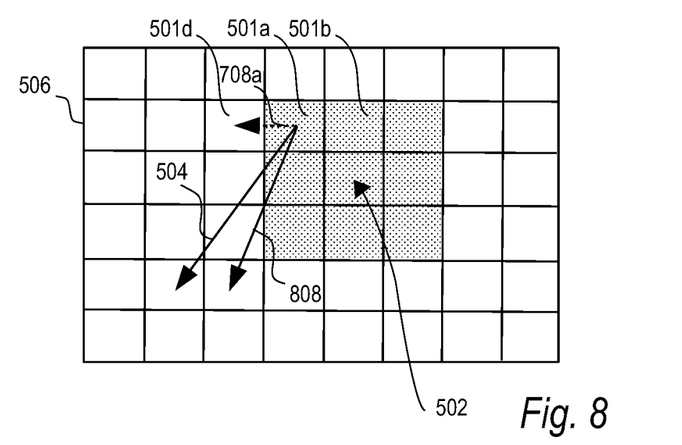
FIG. 8 schematically illustrates a modified cost calculation for a motion vector of a block of pixels in an image according to embodiments.

This is further illustrated in FIG. 8 which continues the example of FIG. 5 and FIG. 7. In step S107 the encoder 104 decided (in each of the four groups of embodiments) to use the modified cost calculation for the candidate motion vector 808 of block 501a. To perform the cost calculation, the encoder 104 compares the candidate motion vector 808 calculated for the block 510a in step S106 to the distance vector 504 of the coherent region 502, and calculates the cost for encoding the difference between these two vectors. Similar to what was described for the regular cost calculation, the cost for encoding the difference may be set to be equal (or proportional) to the length of the difference, which in this example is equal to the length of one block. Thus, when the modified cost calculation is applied, the encoder 104 finds that it is cheap to encode motion vectors that are similar to the distance vector 504.

Taking the FIG. 8 example one step further, one may consider what would happen with the cost calculation for block 501b. In the first and second groups of embodiments, the encoder 104 will use the regular cost calculation for block 501b. The encoder 104 will hence calculate the cost for encoding a motion vector of block 501b relative to the motion vector of a previously encoded neighbouring block. Specifically, it may calculate the cost for the motion vector of block 501b relative to the motion vector of block 501a.

Since the encoder 104 used the modified cost calculation for block 501a, it is likely that it encoded block 501a using a motion vector that is similar to the distance vector 504. Hence, in this case, also the regular cost calculation will assign a low cost to motion vectors being similar to the distance vector 504. The same will apply to the subsequent blocks in the coherent region. For block 501b the modified and the regular cost calculations thus give rise to essentially the same result for block 501b. This explains why the modified cost calculation does not need to be applied to block 501b and the subsequent blocks within the coherent region.

This differs in the third group of embodiments. In that case, the encoder 104 will apply the modified cost calculation also for block 501b. Hence the cost for the motion vectors will be calculated relative to the distance vector 504 for block 501b. Accordingly, low costs will be calculated for motion vectors being similar to the distance vector 504. In this case, the regular cost calculation would have given a different result, due to the different selection of the motion vector of the previously encoded neighbouring block. More specifically, in the third group of embodiments the encoder 104 typically compares the motion vector of the current block to a median of motion vectors of three previously encoded neighbouring blocks. For example, the median may be calculated from the motion vectors of the upper, upper right, and left neighbouring blocks of block 501b. Since only one of these blocks, namely block 501a, has a motion vector which is similar to the distance vector 504, the resulting median motion vector will most likely be quite different from the distance vector 504. As a result, the regular cost calculation will give a high cost for encoding motion vectors that are similar to the distance vector 504.

Further, in the fourth group of embodiments, the encoder 104 will apply the modified cost calculation to all blocks within the coherent region 502. Accordingly, low costs will be calculated for motion vectors being similar to the distance vector 504 for each block of pixels in the coherent region 502.

In step S110, the encoder 104 calculates a cost for encoding the residual between the currently processed block of pixels and each candidate block of pixels in the reference image. For example, the encoder 104 may calculate a measure which quantifies the size of the residual. For example, a sum of absolute differences, a sum of squared differences or any similar measure may be used to quantify the residual.

In step S11, the encoder 104 may then finalize the block-matching procedure by finding a matching block for the currently processed block of pixels. In more detail, the matching block of pixels is the candidate block of pixels in the reference image that minimizes the combined cost for encoding the motion vector and the residual. For example, the encoder 104 may combine the costs by forming a weighted sum of the cost for encoding the motion vector and the cost for encoding the residual. The weights of the sum may be predefined. By using any of the above described groups of embodiments, the matching blocks of pixels for the blocks within the coherent region 502 will likely be associated with a motion vector which is similar to the distance vector 504 of the coherent region.

In step S112 the encoder 104 proceeds to determine whether to inter-code or intra-code the currently processed block of pixels. The encoder 104 makes this decision based on whether it is cheaper to inter-code or intra-code the block of pixels. If it is cheaper to inter-code, the encoder 104 will inter-code the block, and otherwise the block will be intra-coded. The cost for inter-coding the block is the combined cost for encoding the motion vector and the residual of the matching block of pixels determined in step S111. The encoder 104 may further calculate a cost for intra-coding the block. The intra-coding cost may be given in terms of a predefined value which may correspond to an average cost for intra-coding a block as determined from historical data.

If the encoder 104 arrives at the decision to inter-code the block it will proceed to encode the motion vector and the residual corresponding to the matching block of pixels. When encoding the motion vector, it will encode it relative to the motion vector of a neighbouring block of pixels in the image. Notably, this applies regardless of whether the regular (step S108a) or the modified cost calculation (S108b) was applied to the motion vector of the block. Reference is made to the above regarding how the motion vector of a neighbouring block of pixels in the image are calculated for the different groups of embodiments.

Returning to the example of FIGS. 7 and 8, it is noted that when the encoder 104 proceeds from encoding block 501d to block 501a there is a big change in the amount of motion in the image. If the encoder 104 had applied the regular cost calculation when processing block 501a it would likely find that the cost for encoding the candidate motion vector 108 is very high, and as a result it would not inter-code the block 501a using the candidate motion vector 108. However, using any of the above described embodiments, the modified cost calculation is instead used when processing block 501a. As a result, the encoder 104 instead finds that it is cheap to encode the candidate motion vector 108 since it is close to the distance vector 504. The encoder 104 will therefore become more prone to inter-code the block 501a using candidate motion vectors which are similar to the distance vector. This decision causes the encoder 104 to take an extra bit cost for the block 501a, since in reality the motion vector 108 is costly to encode. However, this extra bit cost may be worth taking since the encoder 104 saves bits when encoding at least some of the subsequent blocks in within the coherent region 502. This since the encoding of motion vectors is made in relation to motion vectors of previous blocks. In the example of FIGS. 7 and 8, the bit saving starts already with the next block 501b in the second group of embodiments, while in the third group of embodiments an extra bit cost is incurred for each block on the first row in the coherent region 502 and the bit savings start when processing blocks on the next row in the coherent region 502.

As described above, the block matching starting in step S106 may use a motion vector search window when searching for the matching block in the reference image. The positioning of the search window in relation to the position of a currently processed block of pixels may be used to implement the motion vector encoding cost calculation. This implementation may be applied to either one of the first, second, third, and fourth group of embodiments described above. This will now be further explained with reference to the flow chart of FIG. 9.

Figure 9:
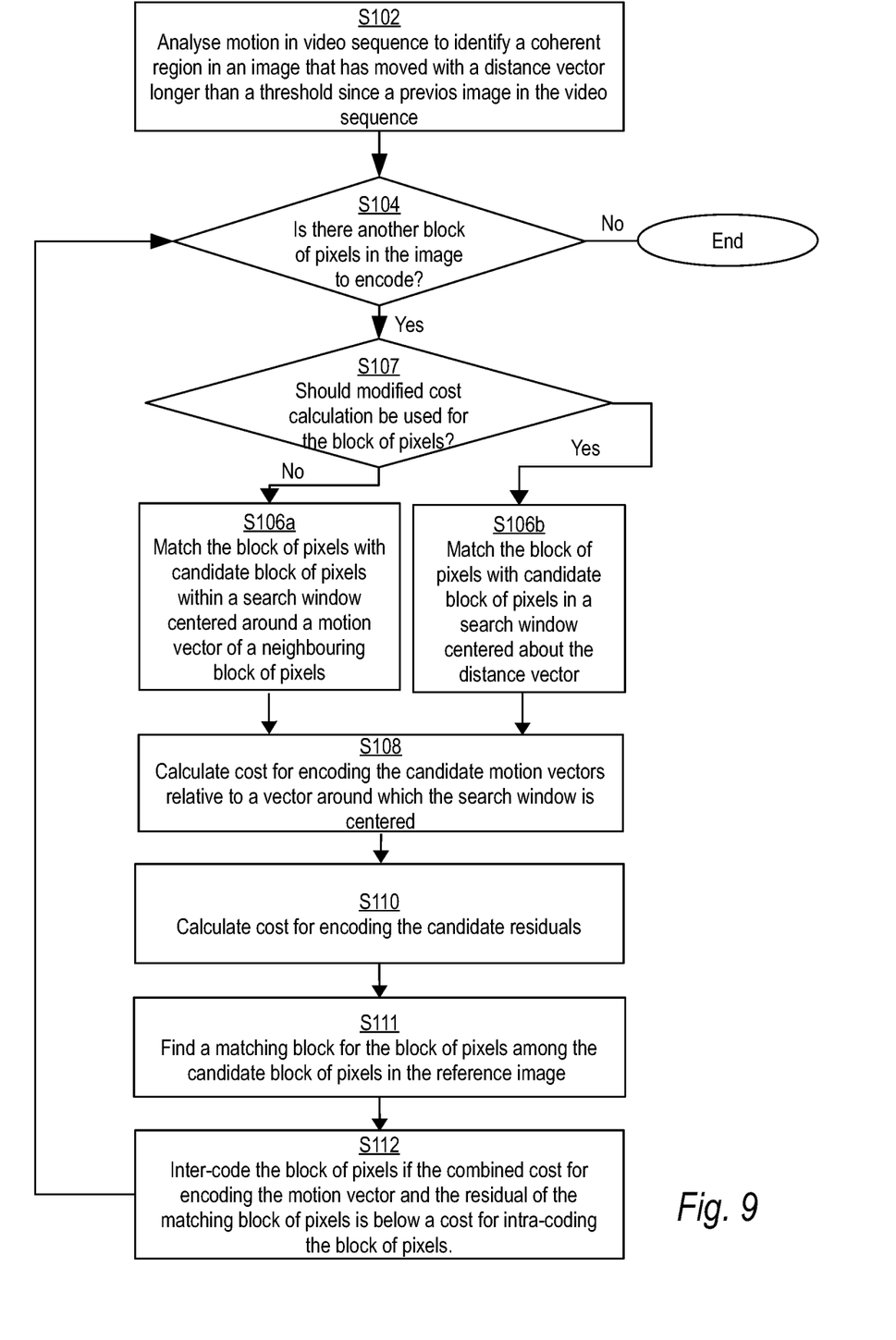
FIG. 9 is a flow chart of a method for encoding an image of a video sequence according to embodiments.
Figure 10:
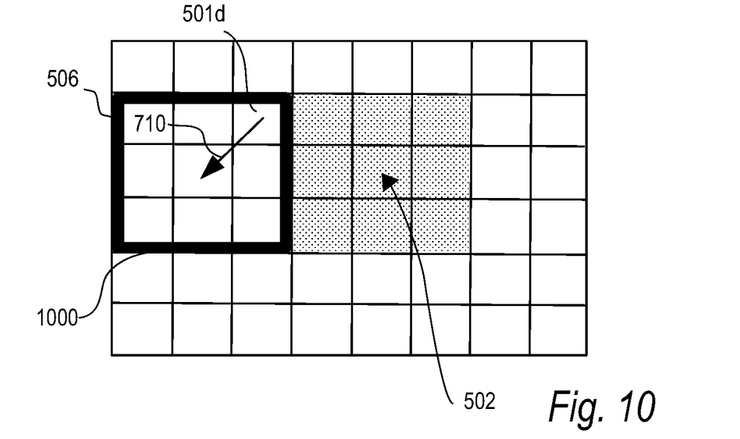
FIG. 10 and FIG. 11 illustrates motion vector search windows used in connection to performing block matching and motion vector cost calculations according to embodiments.

In order to use the approach of FIG. 9, step S107 of checking whether a modified cost calculation should be used for a currently processed block of pixels is performed prior to carrying out the block matching starting at step S106. Specifically, the encoder 104 uses the result of the check in step S107 to decide where to position the motion vector search window in relation to the position of the currently processed block. How to perform the check in step S107 for the first, second, third, and fourth group of embodiments is described above For blocks where a regular cost calculation should be used, the encoder 104 performs in step S106a block matching using a search window in the reference image which is centered around a motion vector of a previously encoded neighbouring block of pixels. In particular, the encoder 104 may match the block of pixels in the currently processed image with candidate blocks of pixels within the search window in the reference image. This is further illustrated in FIG. 10 showing a search window 1000 that the encoder 104 uses when performing block matching with respect to the block 501d. The motion vector 710 of a previously encoded neighbouring block relates the center of the search window to the position of the block 501d. How to select the motion vector of a previously encoded neighbouring block of pixels for the first, second, third, and fourth group of embodiments is described above.

Figure 11:
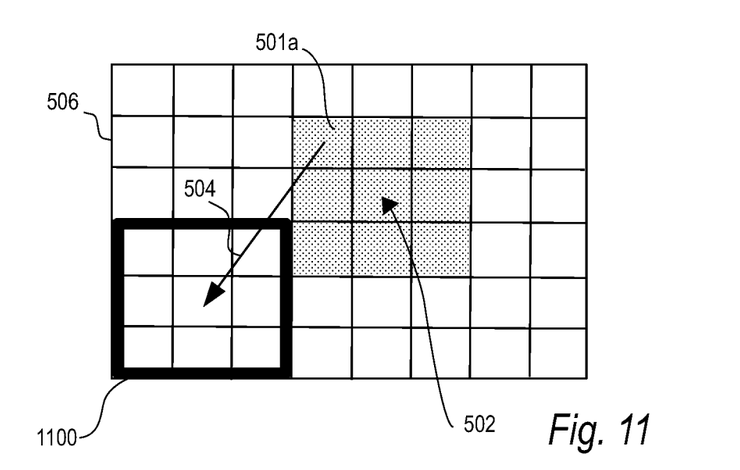

For blocks where a modified cost calculation should be used, the encoder 104 performs block matching using a search window in the reference image which is instead centered around the distance vector. This is further illustrated in FIG. 11 showing a search window 1100 that the encoder 104 uses when performing block matching with respect to the block 501a. The distance vector 504 relates the center of the search window to the position of the block 501d. Using such a search window increases the chances of the encoder 104 finding a motion vector which is similar to the distance vector.

The encoder 104 then proceeds in step S108 to calculate the cost for encoding the motion vectors of the candidate motion vectors found in either of steps S106a and S106b. Specifically, the encoder 104 calculates the cost for encoding each candidate motion vector relative to a vector around which the search window is centered. Thus, for blocks to which the regular cost calculation should be applied, the encoder 104 calculates the cost relative to a motion vector of a neighbouring block of pixels (cf step S108a of FIG. 2). For blocks to which the modified cost calculation should be applied, the encoder 104 instead calculates the cost relative to the distance vector (cf. step S108b of FIG. 2).

As is understood from the above, the analyser 102 and the encoder 104 are hence configured to implement a method for encoding an image of a video sequence. The analyser 102 and the encoder 104 may each be implemented in hardware, in software, or a combination thereof.

In a hardware implementation, each of the analyser 102 and the encoder 104 may correspond to circuitry which is dedicated and specifically designed to provide its functionality. The circuitry may be in the form of one or more integrated circuits, such as one or more application specific integrated circuits or one or more field-programmable gate arrays. By way of example, the encoder 104 may thus comprise circuitry which, when in use, calculates a cost for encoding a motion vector.

In a software implementation, the circuitry may instead be in the form of a processor, such as a microprocessor, which in association with computer code instructions stored on a (non-transitory) computer-readable medium, such as a non-volatile memory, causes the analyser 102 and the encoder 104 to carry out any method disclosed herein. Examples of non-volatile memory include read-only memory, flash memory, ferroelectric RAM, magnetic computer storage devices, optical discs, and the like. In a software case, the analyser 102 and the encoder 104 may thus each correspond to a portion of computer code instructions stored on the computer-readable medium, that, when executed by the processor, causes the system 100 to carry out the functionality of the analyser 102 and the encoder 104, respectively.

It is to be understood that it is also possible to have a combination of a hardware and a software implementation, meaning that some of the functionality of the analyser 102 and 104 is implemented in hardware and others in software.

It will be appreciated that a person skilled in the art can modify the above-described embodiments in many ways and still use the advantages as shown in the embodiments above. For example, while the above embodiments mainly have illustrated one coherent region in the image, the method extends in a natural way to cases when there are more than one coherent region in the image. Further, two different ways of selecting the motion vector of the neighbouring block of pixels applicable to coding using the H.264 and H.265 standards, respectively, have been described. However, it is understood that other modern codec standards may use other ways of selecting a motion vector candidate in relation to which the motion vector of a block of pixels is encoded. This includes selecting a motion vector candidate based on the motion vectors in the reference image at the same block of pixels, by pointing to the motion vector of a specific neighbouring block of pixels, or by calculating an absolute motion vector. If a modern codec standard other than those exemplified is used, it is understood that the approach for selecting the motion vector candidate is carried out as prescribed by the codec standard being used. Thus, the teachings should not be limited to the shown embodiments but should only be defined by the appended claims. Additionally, as the skilled person understands, the shown embodiments may be combined.

The invention claimed is:

1. A method for encoding an image of a video sequence, comprising:
   analysing motion in the video sequence to identify a coherent region in the image that has moved with a distance vector which is longer than a threshold since a previously encoded image in the video sequence; and
   encoding blocks of pixels in the image by, for each block of pixels:
      performing block matching to find a motion vector pointing to a matching block of pixels in a reference image and to calculate a residual between the block of pixels and the matching block of pixels,
      calculating a cost for encoding the motion vector and a cost for encoding the residual,
      wherein, for at least one block of pixels in the coherent region, the cost for encoding the motion vector is calculated as a cost for encoding the motion vector relative to the distance vector of the coherent region instead of being calculated as a cost for encoding the motion vector relative to a motion vector of a neighbouring block of pixels in the image, and
   encoding the block of pixels as an inter-coded block if the cost for encoding the motion vector and the cost for encoding the residual when combined are below a cost for intra-coding the block of pixels.

2. The method of claim 1, wherein blocks of pixels in the coherent region are encoded in a predetermined order, wherein said at least one block of pixels in the coherent region includes a block of pixels in the coherent region which is encoded first according to the predetermined order.

3. The method of claim 2, wherein said at least one block of pixels in the coherent region only includes the block of pixels in the coherent region which is encoded first according to the predetermined order.

4. The method of claim 1, wherein said at least one block of pixels in the coherent region includes all blocks of pixels in the coherent region having less than a predetermined number of previously encoded neighbouring blocks of pixels within the region.

5. The method of claim 4, wherein said at least one block of pixels in the coherent region only includes the blocks of pixels in the coherent region having less than a predetermined number of previously encoded neighbouring blocks of pixels within the region.

6. The method of claim 1, wherein said at least one block of pixels in the coherent region includes all block of pixels in the coherent region.

7. The method of claim 1, wherein said motion vector of a neighbouring block of pixels in the image corresponds to a median of motion vectors of a number of previously encoded neighbouring blocks of pixels in the image.

8. The method of claim 1, wherein the step of performing block matching includes using a motion vector search window to find the motion vector pointing to a matching block of pixels in the reference image, and
wherein, for said at least one block of pixels in the coherent region, the search window is centered around the distance vector of the coherent region instead of being centered around the motion vector of a neighbouring block of pixels.

9. The method of claim 8, wherein the cost for encoding the motion vector of a block of pixels is calculated as a cost for encoding the motion vector relative to a vector around which the motion vector search window is centered.

10. The method of claim 1, wherein the video sequence is captured by a camera 30 having a movable field-of-view, wherein the step of analysing motion in the video sequence is based on an input from the camera regarding a movement of the field-of-view.

11. The method of claim 1, wherein the step of analysing motion in the video 5 sequence includes detecting objects and their motion in the video sequence using an object detection algorithm.

12. The method of claim 1, wherein the size of the coherent region in the image is larger than a threshold which depends on the length of the distance vector of the coherent 10 region.

13. The method of claim 1, further comprising:
analysing motion in the video sequence to identify a second coherent region in the image that has moved with a second distance vector which is longer than a threshold 15 since a previously encoded image in the video sequence,
wherein, for at least one block of pixels in the second coherent region, the cost for encoding the motion vector is calculated as a cost for encoding the motion vector relative to the second distance vector of the second coherent region instead of being calculated as a cost for encoding the motion vector relative to a motion vector of a neighbouring block of pixels in the image.

14. A system for encoding an image of a video sequence, comprising:
an analyser configured to analyse motion in the video sequence to identify a coherent region in the image that has moved with a distance vector which is longer than 25 a threshold since a previously encoded image in the video sequence; and
an encoder configured to encode blocks of pixels in the image by, for each block of pixels:
performing block matching to find a motion vector pointing to a matching block of pixels in a reference image and to calculate a residual between the block of pixels and the matching block of pixels,
calculating a cost for encoding the motion vector and a cost for encoding the residual,
wherein, for at least one block of pixels in the coherent region, the cost for encoding the motion vector is calculated as a cost for encoding the motion vector relative to the distance vector of the coherent region instead of being calculated as a cost for encoding the motion vector relative to a motion vector of a neighbouring block of pixels in the image, and
encoding the block of pixels as an inter-coded block if the cost for encoding the motion vector and the cost for encoding the residual together are below a cost for intra-coding the block of pixels.

15. A non-transitory computer-readable medium having computer-code instructions stored thereon which, when executed by a processor, causes the processor to carry out a method for encoding an image of a video sequence, the method comprising:
analysing motion in the video sequence to identify a coherent region in the image that has moved with a distance vector which is longer than a threshold since a previously encoded image in the video sequence; and
encoding blocks of pixels in the image by, for each block of pixels:
performing block matching (to find a motion vector pointing to a matching block of pixels in a reference image and to calculate a residual between the block of pixels and the matching block of pixels,
calculating a cost for encoding the motion vector and a cost for encoding the residual,
wherein, for at least one block of pixels in the coherent region, the cost for encoding the motion vector is calculated as a cost for encoding the motion vector relative to the distance vector of the coherent region instead of being calculated as a cost for encoding the motion vector relative to a motion vector of a neighbouring block of pixels in the image, and
encoding the block of pixels as an inter-coded block if the cost for encoding the motion vector and the cost for encoding the residual when combined are below a cost for intra-coding the block of pixels.

* * * * *